US012717721B2

(12) United States Patent
Castorina et al.

(10) Patent No.: US 12,717,721 B2
(45) Date of Patent: Aug. 25, 2026

(54) OPERATIONAL MODES FOR PREFETCH GENERATION CIRCUITRY

(71) Applicant: Arm Limited, Cambridge (GB)

(72) Inventors: Ugo Castorina, Antibes (FR); Damien Matthieu Valentin Cathrine, Mougins (FR); Diogo Augusto Pereira Marques, Antibes (FR); Marco Coletta, Antibes (FR)

(73) Assignee: Arm Limited, Cambridge (GB)

( * ) Notice: Subject to any disclaimer, the term of this patent is extended or adjusted under 35 U.S.C. 154(b) by 30 days.

(21) Appl. No.: 18/411,214

(22) Filed: Jan. 12, 2024

(65) Prior Publication Data

US 2025/0231880 A1 Jul. 17, 2025

(51) Int. Cl.
*G06F 12/0862* (2016.01)
*G06F 12/0891* (2016.01)

(52) U.S. Cl.
CPC ...... *G06F 12/0862* (2013.01); *G06F 12/0891* (2013.01)

(58) Field of Classification Search
None
See application file for complete search history.

(56) References Cited

U.S. PATENT DOCUMENTS 6,393,527 B1 * 5/2002 Rao .......................... G06F 9/382 711/213
2019/0065376 A1 * 2/2019 Lee ..................... G06F 12/0855
2019/0213130 A1 * 7/2019 Madugula ........... G06F 12/0895
2022/0261349 A1 * 8/2022 Kim .................... G06F 12/0868

* cited by examiner

*Primary Examiner* — Charles J Choi
(74) *Attorney, Agent, or Firm* — NIXON & VANDERHYE P.C.

(57) ABSTRACT

There is provided an apparatus, a system, a chip containing product, a method and a medium. The apparatus comprises prefetch generation circuitry configured to generate prefetch requests. The apparatus is also provided with control circuitry configured to determine an operational mode for the prefetch generation circuitry from a plurality of operational modes comprising an offline mode in which prefetch requests are not generated and at least one online mode in which prefetch requests are generated. The control circuitry is configured to switch the prefetch generation circuitry from the online mode to the offline mode for an offline period based on a mode switching criterion. The control circuitry is responsive to a switch to the offline mode, to apply modified switching criteria to determine whether the prefetch generation circuitry should operate in the offline mode during a future period occurring subsequent to the offline period.

20 Claims, 12 Drawing Sheets

OPERATIONAL MODES FOR PREFETCH GENERATION CIRCUITRY

TECHNICAL FIELD

The present invention relates to data processing. More particularly the present invention relates to an apparatus, a system, a chip containing product, a method, and a non-transitory computer readable medium.

BACKGROUND

Some apparatuses are provided with prefetch generation circuitry to generate prefetch requests. The prefetch requests are to prefetch data into local storage circuitry in anticipation of that data being required in response to a demand request from processing circuitry.

SUMMARY

According to a first aspect of the present techniques there is provided an apparatus comprising:

prefetch generation circuitry configured to generate prefetch requests to prefetch data from memory into local storage circuitry in advance of a demand request for the data by processing circuitry; and control circuitry configured to determine an operational mode for the prefetch generation circuitry from a plurality of operational modes comprising an offline mode in which prefetch requests are not generated and at least one online mode in which prefetch requests are generated, wherein the control circuitry is configured:

to switch the prefetch generation circuitry from the at least one online mode to the offline mode for an offline period based on a mode switching criterion, the offline period lasting for an offline duration; and in response to a switch to the offline mode, to apply modified switching criteria to determine whether the prefetch generation circuitry should operate in the offline mode during a future period occurring subsequent to the offline period.

According to a second aspect of the present techniques there is provided a system comprising:

the apparatus of the first aspect, implemented in at least one packaged chip;

at least one system component; and a board, wherein the at least one packaged chip and the at least one system component are assembled on the board.

According to a third aspect of the present techniques there is provided a chip-containing product comprising the system of the second aspect assembled on a further board with at least one other product component.

According to a fourth aspect of the present techniques there is provided a method comprising:

with prefetch generation circuitry, generating prefetch requests to prefetch data from memory into local storage circuitry in advance of a demand request for the data by processing circuitry;

determining an operational mode for the prefetch generation circuitry from a plurality of operational modes comprising an offline mode in which prefetch requests are not generated and at least one online mode in which prefetch requests are generated;

switching the prefetch generation circuitry from the at least one online mode to the offline mode for an offline period based on a mode switching criterion, the offline period lasting for an offline duration; and in response to a switch to the offline mode, applying modified switching criteria to determine whether the prefetch generation circuitry should operate in the offline mode during a future period occurring subsequent to the offline period.

According to a further aspect of the present techniques there is provided a non-transitory computer-readable medium to store computer-readable code for fabrication of an apparatus comprising:

prefetch generation circuitry configured to generate prefetch requests to prefetch data from memory into local storage circuitry in advance of a demand request for the data by processing circuitry; and control circuitry configured to determine an operational mode for the prefetch generation circuitry from a plurality of operational modes comprising an offline mode in which prefetch requests are not generated and at least one online mode in which prefetch requests are generated, wherein the control circuitry is configured:

to switch the prefetch generation circuitry from the at least one online mode to the offline mode for an offline period based on a mode switching criterion, the offline period lasting for an offline duration; and in response to a switch to the offline mode, to apply modified switching criteria to determine whether the prefetch generation circuitry should operate in the offline mode during a future period occurring subsequent to the offline period.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
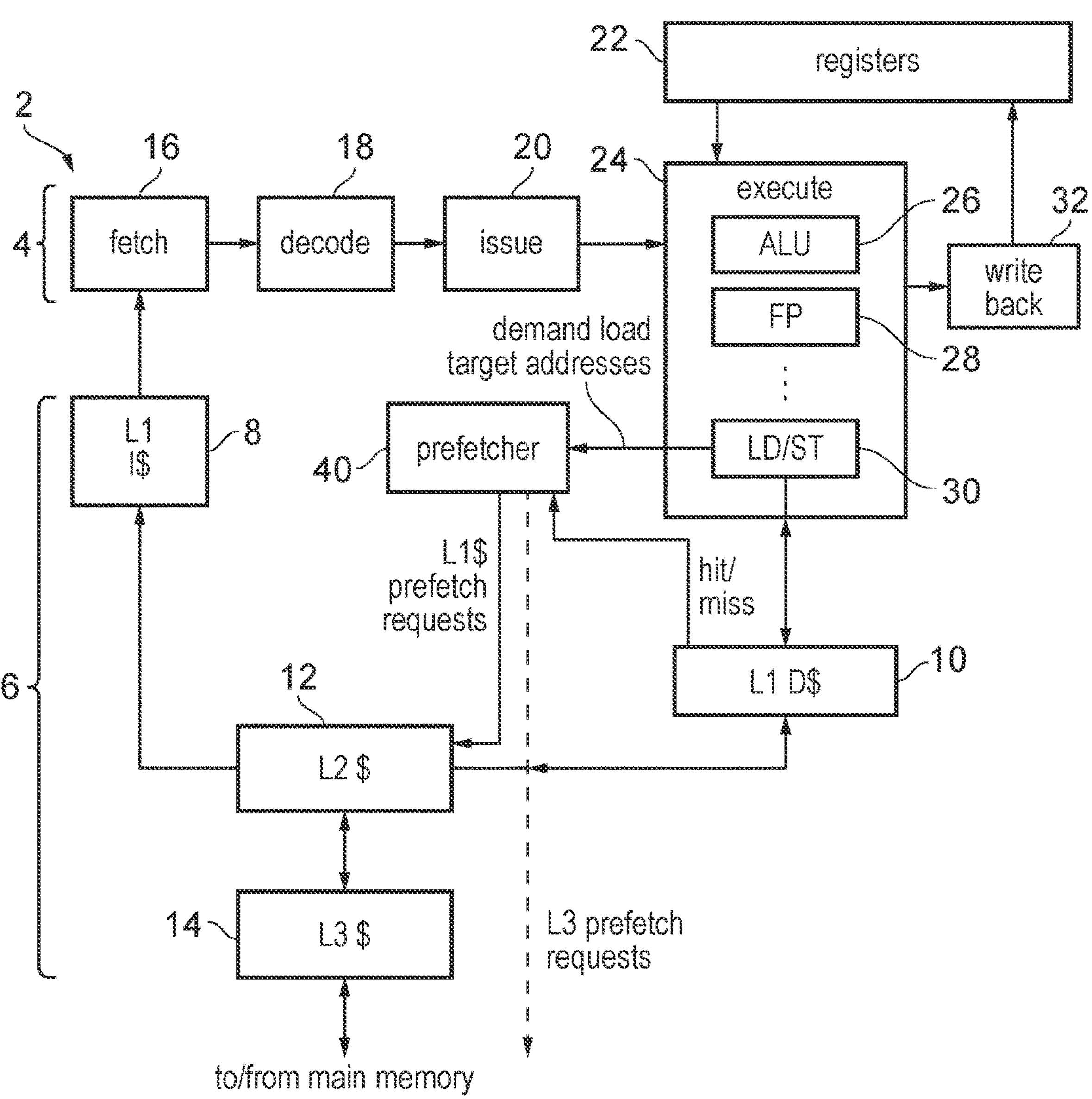
FIG. 1 schematically illustrates an apparatus according to some configurations of the present techniques.

Before discussing the configurations with reference to the accompanying figures, the following description of configurations is provided.

According to some configurations of the present technique there is provided an apparatus comprising prefetch generation circuitry configured to generate prefetch requests to prefetch data from memory into local storage circuitry in advance of a demand request for the data by processing circuitry. The apparatus is also provided with control circuitry configured to determine an operational mode for the prefetch generation circuitry from a plurality of operational modes comprising an offline mode in which prefetch requests are not generated and at least one online mode in which prefetch requests are generated. The control circuitry is configured to switch the prefetch generation circuitry from the at least one online mode to the offline mode for an offline period based on a mode switching criterion, the offline period lasting for an offline duration. The control circuitry is also responsive to a switch to the offline mode, to apply modified switching criteria to determine whether the prefetch generation circuitry should operate in the offline mode during a future period occurring subsequent to the offline period.

Prefetch generation circuitry is used to enable an apparatus to generate prefetch requests for data to be moved into local storage circuitry (for example one or more levels of cache) in advance of an anticipated (predicted) demand request for that data. Prefetching is a speculative technique and is based on a prediction that the data will be required. Because the technique is speculative, there may be some workloads for which the prefetch generation circuitry is able to accurately predict the data that will be required by the processing circuitry, and there may be other workloads for which the prefetch generation circuitry is only able to predict the data with limited accuracy or for which the prefetch generation circuitry is unable to make accurate predictions. In such use cases, the prefetched data may be of limited use.

Continuing prefetch generation when the prefetched data is not useful can result in wasted power and pollution of the local storage circuitry due to unnecessary data being prefetched into the local storage circuitry, potentially resulting in less or limited space for data that is actually required by the processing circuitry. To help reduce the likelihood that this will occur, the control circuitry is configured to switch the prefetch generation circuitry between a plurality of modes based on a mode switching criterion. The plurality of modes include at least one online mode where the prefetch generation circuitry is able to generate prefetches, and an offline mode in which the prefetch generation circuitry is prevented from generating prefetches. The switching of the mode is based on a mode switching criteria which will be discussed in further detail below.

Dependent on the conditions of the apparatus at the time of prefetch generation (e.g., overall workload, memory congestion, etc.), there is the potential that the conditions required to meet the mode switching criteria may fluctuate frequently. To prevent the prefetch generation circuitry from switching mode equally frequently, when the prefetch generation circuitry is switched to the offline mode, it is held (e.g., retained or maintained) in this mode for an offline period that lasts for an offline duration. During this offline period, the prefetch generation circuitry will remain in the offline mode, even if the conditions that caused the prefetch generation circuitry to switch to the offline mode are not sustained.

Alternatively, or in addition, whilst the prefetch generation circuitry is in the offline mode, it may be difficult, or not possible, to determine whether the mode switching criteria is satisfied. For example, if the mode switching criterion is determined to be satisfied or not satisfied based on a performance of the prefetches that are generated, then this information may be difficult to accurately determine whilst the prefetch generation circuitry is in the offline mode and may not be available until one or more prefetches have been generated subsequent to switching to the online mode.

The inventors have recognised that maintaining the prefetch generation circuitry in the offline mode for the offline period and, when the offline period has expired, switching the prefetch generation circuitry to the online mode with switching determined by the mode switching criterion, may result in an unnecessary expenditure of power if the current use case is still one in which the prefetch generation circuitry is unable to operate in a useful manner. For example, switching the prefetch generation to the online mode in such circumstances may result in the control circuitry quickly identifying that the mode switching criterion is satisfied and switching the prefetch generation circuitry back to the offline mode (an OFF-ON-OFF transition). The control circuitry is responsive to the switch to the offline mode to apply a modified switching criteria. The modified switching criteria is used to determine an operational mode of the prefetch generation circuitry during a future period. In other words, the modified switching criteria is used to determine the mode of the prefetch generation circuitry once the offline period has expired. However, the modified switching criteria may be based on information that is obtained during the offline period, and evaluation of the modified switching criteria may begin before the end of the offline period. The modified switching criteria therefore is used to determine the operational mode of the prefetch generation circuitry in a future period that is subsequent to (occurs after) the offline period. By using a modified switching criteria that affects the operational mode of the prefetch generation circuitry in the future period, the control circuitry is able to reduce unnecessary switching of the prefetch mode that may occur subsequent to the offline period.

The future period may be any period that is subsequent (either immediately subsequent to, or at some subsequent point separate by one or more other periods) to the offline period. In some configurations the future period comprises an activation period; the control circuitry is configured to switch the prefetch generation circuitry from the offline mode to the at least one online mode subsequent to the offline period; and the modified switching criteria prevents the control circuitry switching the prefetch generation circuitry to the offline mode during the activation period. The prefetch generation circuitry is therefore, subsequent to the offline period, held in one of the at least one online modes, for at least the activation period. The activation period therefore allows time for the prefetcher to become useful and prevents the prefetcher from being switched to the offline mode based on stale data (either generated as a result of prefetches prior to the offline period, or generated from one or more other prefetching circuits that may be provided). During the activation period, the prefetch generation circuitry may be throttled such that the prefetches are generated at a minimum rate. However, the throttling is prevented from being so severe as to stop any prefetches from being generated.

The duration of the activation period can be any duration, and may be measured in terms of, e.g., a number of prefetch requests, a number of cache accesses, a number of cache evictions and/or, a number of clock cycles. In some configurations the activation period extends until a prefetcher specific performance metric is calculated. For example, the control circuitry may be configured to base the determination as to whether the mode switching criterion is satisfied on one or more prefetcher specific metrics. As discussed, when the prefetch generation circuitry is operating in the offline mode, the control circuitry may be unable to generate the prefetcher specific metrics. As a result, it may be difficult for the control circuitry to obtain an accurate picture of how the prefetch generation circuitry is performing until the prefetch generation circuitry has been operating for a sufficient time that the prefetcher specific metric can be calculated. This approach prevents the prefetch generation circuitry from being switched off based on stale data.

In some configurations the prefetcher specific performance metric is an accuracy metric relating to the accuracy of the prefetch requests. For example, the prefetcher accuracy metric may be based on how many prefetch requests return data that is required by a subsequent demand request. In addition, or as an alternative, the prefetcher accuracy metric may relate to a number of prefetch requests that return data that is retained in the cache until it is used, i.e., data that is not evicted from the cache before a subsequent demand request for that data.

In some configurations the control circuitry is responsive to the prefetcher specific performance metric being calculated, to adjust the offline duration. During the activation period, the control circuitry may make modifications to the offline duration so that a future offline period lasts for a different duration. This allows the control circuitry to tune the offline period based on data indicative of how well the prefetch generation circuitry responds subsequent to the offline period.

In some configurations the control circuitry is responsive to the prefetcher specific performance metric being satisfied: when the mode switching criterion is satisfied, to extend the offline duration; and when the mode switching criterion is not satisfied, to reduce the offline duration. If, but for the activation period, the control circuitry would have caused an OFF-ON-OFF transition, where the prefetch generation circuitry was quickly turned off again subsequent to the offline period, then the offline period may be extended to increase the likelihood that the prefetch generation circuitry would become useful subsequent to a second offline period. Alternatively, if the control circuitry would have caused an OFF-ON-ON transition, where the prefetch generation circuitry became useful subsequent to being turned off and back on, then the control circuitry may reduce the offline period to provide greater opportunity for the prefetch generation circuitry to become useful sooner subsequent to the second offline period.

In addition, or as an alternative, to the activation period, in some configurations the future period comprises an additional offline period; and the modified switching criteria prevents the control circuitry switching the prefetch generation circuitry to the at least one online mode during the additional offline period. The modified switching criteria may, for example, dependent on one or more system metrics, prevent the control circuitry from switching to the online mode subsequent to the offline period. In other words, the control circuitry may determine, whilst the prefetch generation circuitry is operating in the offline mode, that the system conditions are not correct for the prefetcher to be switched back on. The additional offline period has the effect of extending the offline period and helps prevent the operational mode of the prefetch generation circuitry from being frequently switched.

In some configurations the control circuitry is configured to calculate an extended offline duration of the extended offline period based on a residual prefetcher specific performance metric. The control circuitry is not able to obtain a full set of prefetcher specific metrics whilst the prefetch generation circuitry is not generating prefetches. Due to the delay between a prefetch being generated and a determination as to whether a demand request for the data that has been prefetched is issued, there may be prefetched data that has been fetched into the local storage circuitry but, at the point when the prefetch generation circuitry is switched to the offline mode, it has not yet been determined whether that prefetched data is useful. As a result, there is a possibility that a usefulness or accuracy of a prefetcher may have either increased (or decreased) and that this has not yet been detected by the control circuitry implementing the mode switching criterion. By also basing the switching of the operational mode on the residual prefetcher specific performance metric, the control circuitry is able to more accurately determine whether the prefetch generation circuitry should be maintained in the offline mode.

In some configurations the residual prefetcher specific performance metric is calculated based on evictions of prefetched data from the local storage circuitry. The prefetched data may have been prefetched prior to the prefetch generation circuitry being switched to the offline mode. Hence, the accuracy of those prefetches can be taken into account when determining an operational mode for the prefetch generation circuitry.

In some configurations the residual prefetcher specific performance metric is calculated from a number of useful prefetch requests evicted from the local storage circuitry compared to a number of unused prefetched requests evicted from the local storage circuitry. The prefetched data may be marked as used once it has been accessed by the processing circuitry. By monitoring this data, the control circuitry is able to identify whether or not the prefetch generation circuitry was generating useful prefetch requests prior to being switched to the offline mode.

In some configurations the control circuitry is configured to switch the prefetch generation circuitry from the offline mode to the at least one online mode subsequent to the additional offline period and to extend the offline duration by the extended offline duration. As a result, the duration of a next offline period when, subsequently, the prefetch generation circuitry is switched to the offline mode, can be updated based on the recent behaviour of the prefetch generation circuitry.

In some configurations the mode switching criterion is based on a combination of a prefetcher metric specific to the prefetch generation circuitry and a memory system metric dependent on at least one event which is independent of prefetch generation by the prefetch generation circuitry; and the modified switching criteria excludes the memory system metric. Using the combination of the memory system metric and the prefetcher metric for the mode switching criterion allows the control circuitry to take account of both the performance of the prefetch generation circuitry and a measurement of how the memory system is performing, for example, a congestion of the memory system. By excluding the memory system metric for the modified switching criteria, the control circuitry is able to tailor the determination of whether the prefetch generation circuitry should operate in the offline mode during the future period to ensure that information relevant to the prefetcher is included in the determination. In some configurations, in addition to being dependent on at least one event which is independent of prefetch generation by the prefetch generation circuitry, the memory system metric may also be dependent on one or more other events which are dependent of prefetch generation by the prefetch generation circuitry.

In some configurations the prefetcher metric is a prefetch accuracy metric calculated based on evictions from the local storage circuitry, and the memory system metric is a congestion metric based on a number of cycles taken to respond to the prefetch requests. The control circuitry may therefore consider the mode switching criterion to be satisfied when, for example, the memory system accuracy metric falls below a threshold and/or the number of cycles taken to respond to the prefetch requests becomes too large. The number of cycles taken to respond to prefetch requests is dependent on an event independent of the prefetch generation independent of prefetch generation, because demand memory accesses can use up cache bandwidth and so slow down processing of prefetch requests.

The determination as to whether the mode switching criterion is satisfied may be based on instantaneous measurements. Alternatively, or in addition, in some configurations the control circuitry is configured to retain a history of at least one of the prefetcher metric and the memory system metric, and the switching criteria is based on the history. The history may be incorporated in any way, for example, by storing a record of a number of previous measurements and taking an average of those measurements. Alternatively, at a time of generating a new metric, the control circuitry may take a previous measurement of the old metric, divide that old measurement by a scaling factor, e.g., two (for example, by performing a right shift), and add the old measurement to a new measurement. In this way, the preceding measurements can also be incorporated into the prefetcher metric and the memory system metric which are therefore less susceptible to noise generated by singular events in the program flow.

In some configurations the prefetch generation circuitry comprises prefetch training circuitry configured to generate training information to be used by the prefetch generation circuitry to generate the prefetch requests; and the prefetch training circuitry is configured to generate the training information when operating in both of the offline mode and the at least one online mode. The training circuitry is therefore retained in the on state independent as to whether the prefetch generation circuitry is operating in the online mode or the offline mode. Therefore, the training circuitry is able to generate training data to be used by the prefetch generation circuitry to generate the prefetch requests whilst the prefetch generation circuitry is in the offline mode. This approach allows the prefetch generation circuitry to become useful quicker once it is switched back to the online mode.

The offline duration may be measured (specified) in terms of any parameters of the apparatus. For example, the offline duration may be measured in terms of a number of cycles, a number of lookups in the local storage circuitry, or a number of time units (e.g., seconds). In some configurations the offline duration is measured in terms of evictions from the local storage circuitry. Measuring the duration in this way reduces the dependence of the metrics on the type of processing that is being carried out and results in an improved estimate of the behaviour of the prefetch generation circuitry.

Particular configurations will now be described with reference to the figures.

FIG. 1 illustrates an example of a data processing apparatus 2. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 60 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests discussed below. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example, a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 for analyzing patterns of demand target addresses specified by demand memory access requests issued by the load/store unit 30, and detecting stride sequences of addresses where there are a number of addresses separated at regular intervals of a constant stride value. The prefetcher 40 uses the detected stride address sequences to generate prefetch load requests which are issued to the memory system 6 to request that data is brought into a given level of cache. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled. The prefetcher 40 may be able to perform prefetching into a single cache or into multiple caches. For example, FIG. 1 shows an example of the prefetcher 40 issuing level 1 cache prefetch requests which are sent to the level 2 cache 12 or downstream memory and request that data from prefetch target addresses is brought into the level 1 data cache 10. Also the prefetcher 40 in this example can also issue level 3 prefetch requests to the main memory requesting that data from prefetch target addresses is loaded into the level 3 cache 14. The level 3 prefetch request may look a longer distance into the future than the level 1 prefetch requests to account for the greater latency expected in obtaining data from main memory into the level 3 cache 14 compared to obtaining data from a level 2 cache into the level 1 cache 10. In systems using both level 1 and level 3 prefetching, the level 3 prefetching can increase the likelihood that data requested by a level 1 prefetch request is already in the level 3 cache. However, it will be appreciated that the particular caches loaded based on the prefetch requests may vary depending on the particular circuit of implementation.

It would be readily apparent to the skilled person that a stride based prefetcher, such as the one described in relation to FIG. 1 is merely one example of a possible prefetcher. The prefetcher may, in some configurations, predict access patterns based on a producer-consumer relationship between two memory access instructions. The person of ordinary skill in the art would appreciate that the prefetch generation circuitry can be of any form and use any algorithm to generate the prefetch requests.

Figure 2:
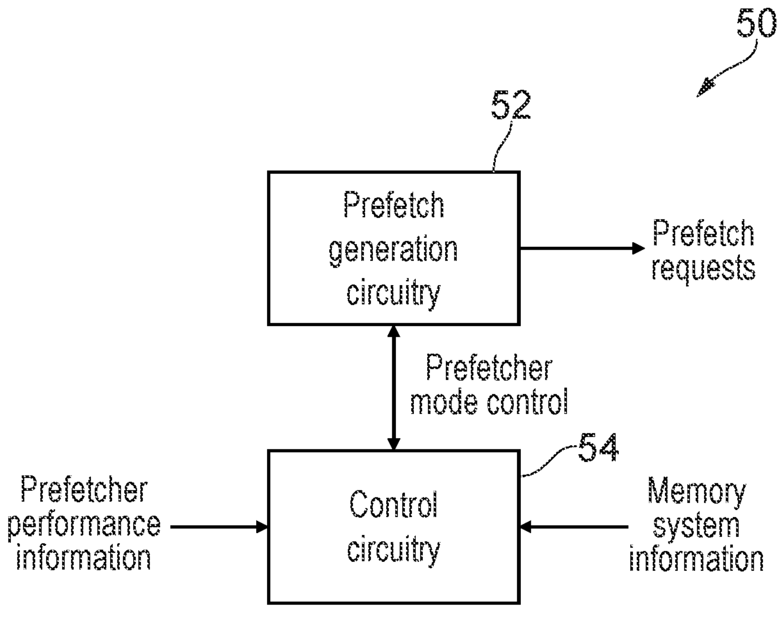
FIG. 2 schematically illustrates an apparatus according to some configurations of the present techniques.

FIG. 2 schematically illustrates details of an apparatus 50 according to some configurations of the present techniques. The apparatus 50 is provided with prefetch generation circuitry 52 and control circuitry 54. The prefetch generation circuitry 52 is configured to generate prefetch requests based on training data that has been generated during a training phase by prefetch training circuitry provided either as part of the prefetch generation circuitry or as a separate circuit. The prefetch generation circuitry 52 is coupled to the control circuitry 54 which determines an operational mode of the prefetch generation circuitry 52. The control circuitry 54 may determine if the prefetch generation circuitry 52 is operating in one of one or more possible online modes in which the prefetch generation circuitry 52 is able to generate prefetch requests, or if it is operating in an offline mode in which the prefetch generation circuitry 52 is unable to generate prefetch requests. The control circuitry 54 makes the determination based on prefetcher performance information indicative of a performance of the prefetch generation circuitry 52, for example, accuracy level information, and on memory system information dependent on at least one event which is independent of prefetch generation by the prefetch generation circuitry. The memory system information may include, for example, congestion information relating to a congestion of a memory system, or a stall rate level indicating a rate of stalls of the prefetch request.

Figure 3:
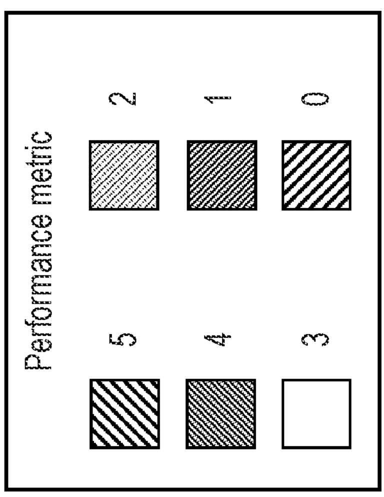
FIG. 3 schematically illustrates a combination of a stall rate level and an accuracy level according to some configurations of the present techniques.
Figure 3:
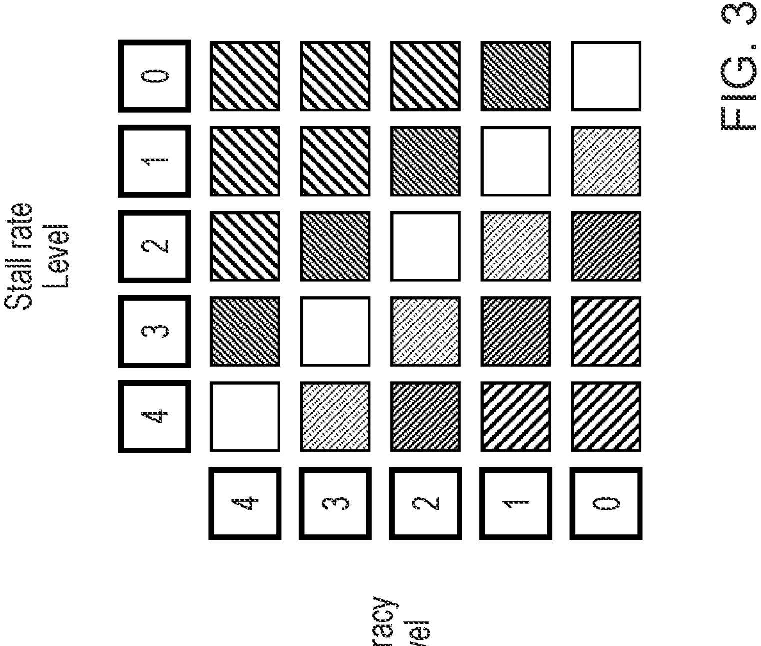

FIG. 3 schematically illustrates the combination of a stall rate level and an accuracy level to determine an overall performance metric. The stall rate level and the accuracy level are discretised into 5 different levels. The stall rate level ranges from 0 (low rate of stalls) to 4 (high rate of stalls) and the accuracy level ranges from 0 (low level of accuracy) to 4 (high level of accuracy). Overall, the operational mode of the prefetch generation circuitry is dependent on a combination of the discretised stall rate and the discretised accuracy level. A low rate of stalls and a high accuracy means that the prefetcher is performing well. On the other hand, a high rate of stalls and a low accuracy means that the prefetcher (prefetch generation circuitry) is performing poorly and it may be beneficial to switch the prefetcher to operate in the offline mode. The control circuitry determines the operational mode based on the combination of the stall rate and the accuracy level. In the illustrated configuration, the stall rate and the accuracy level are combined with one another to provide six different performance metric levels (as indicated by the different types of shading in FIG. 3). The operational mode of the prefetch generation circuitry is determined by the performance metric. In the illustrated configuration, a performance metric of 0 indicating a low accuracy and a high stall rate results in the prefetch generation circuitry being switched to the offline mode. A performance metric from 1 to 5 does not result in the prefetch generation circuitry being switched to the offline mode. A performance metric of 1 to 5 may result in different throttling levels being applied to the prefetch generation circuitry. It would be readily apparent to the person of ordinary skill in the art that the performance metric of FIG. 3 could be modified dependent on the specific implementation and that the different accuracy levels and stall rates could be combined in any way to generate the performance metric.

FIGS. 4 to 8 schematically illustrate the use of the performance metric to determine the operational mode of the prefetch generation circuitry in the future period according to some configurations of the present techniques.

Figure 4:
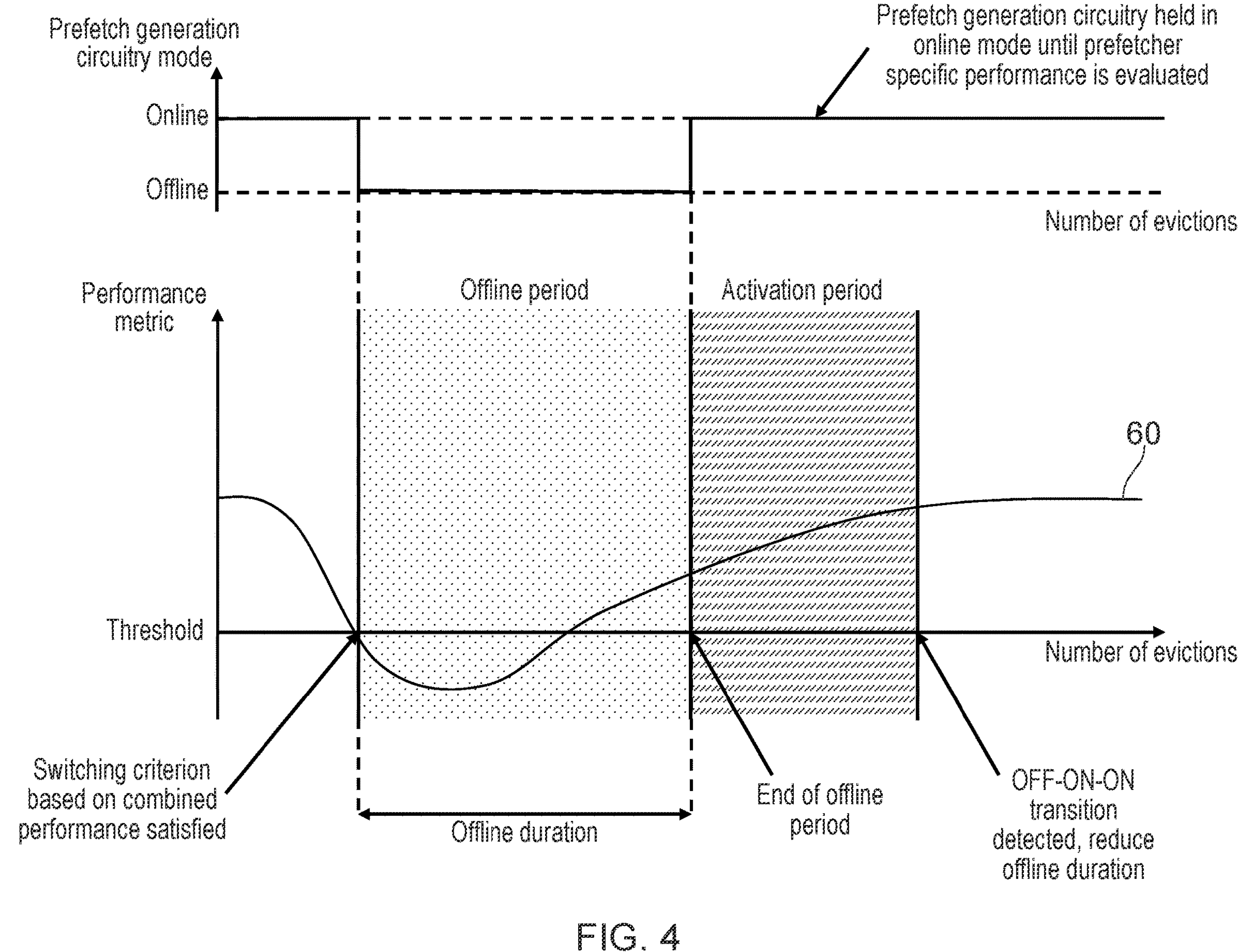
FIG. 4 schematically illustrates mode switching according to some configurations of the present techniques.

FIG. 4 schematically illustrates an example use of a performance metric 60 to determine the operational mode of the prefetch generation circuitry in the future period. The performance metric 60 is calculated (updated) after a set number of evictions and varies relative to a threshold. The performance metric 60 may be calculated, for example, as discussed in relation to FIG. 3, and may include a prefetcher specific metric and a memory system metric dependent on at least one event which is independent of prefetch generation by the prefetch generation circuitry. When the performance metric 60 is above the threshold, the prefetch generation circuitry is operated in the online mode. After an initial number of evictions, the performance metric 60 drops. This may be due to a change in use of the apparatus, e.g., a change in the context in which the apparatus is operating, or due to external factors affecting the availability of the memory system. Once the performance metric 60 falls below the threshold, the switching criterion based on the performance metric 60 is satisfied and the prefetch generation circuitry is switched to operate in the offline mode. When the prefetch generation circuitry is operating in the offline mode, it is unable to generate prefetch requests. The prefetch generation circuitry is held in the offline mode for an offline period which lasts for an offline duration. The prefetch circuitry is held in the offline mode even if the performance metric 60 increases so that it is above the threshold within the offline period. In the illustrated configuration, once the offline period has expired, i.e., once the number of evictions specified in the offline duration have occurred, the prefetch generation circuitry is switched to the online mode for the future period. The future period includes an activation period which begins at the end of the offline period. During the activation period, the prefetch generation circuitry is operated in the online mode which lasts until a measurement of the performance metric 60 has been completed based on the operational characteristics of the prefetch generation circuitry. In other words, the activation period continues until the control circuitry is confident that the performance metric 60 reflects the behaviour of the prefetch generation circuitry. In the illustrated configuration, the performance metric 60 continues to increase during the activation period and indicates that the prefetch generation circuitry is performing above the threshold. At the end of the activation period, the control circuitry identifies that the prefetch generation circuitry should remain in the online state, corresponding to an OFF-ON-ON transaction. Hence, the control circuitry controls the prefetch generation circuitry to operate in the online mode and, due to the detected OFF-ON-ON transition, the control circuitry reduces the offline duration to be applied during a future offline period.

Figure 5:
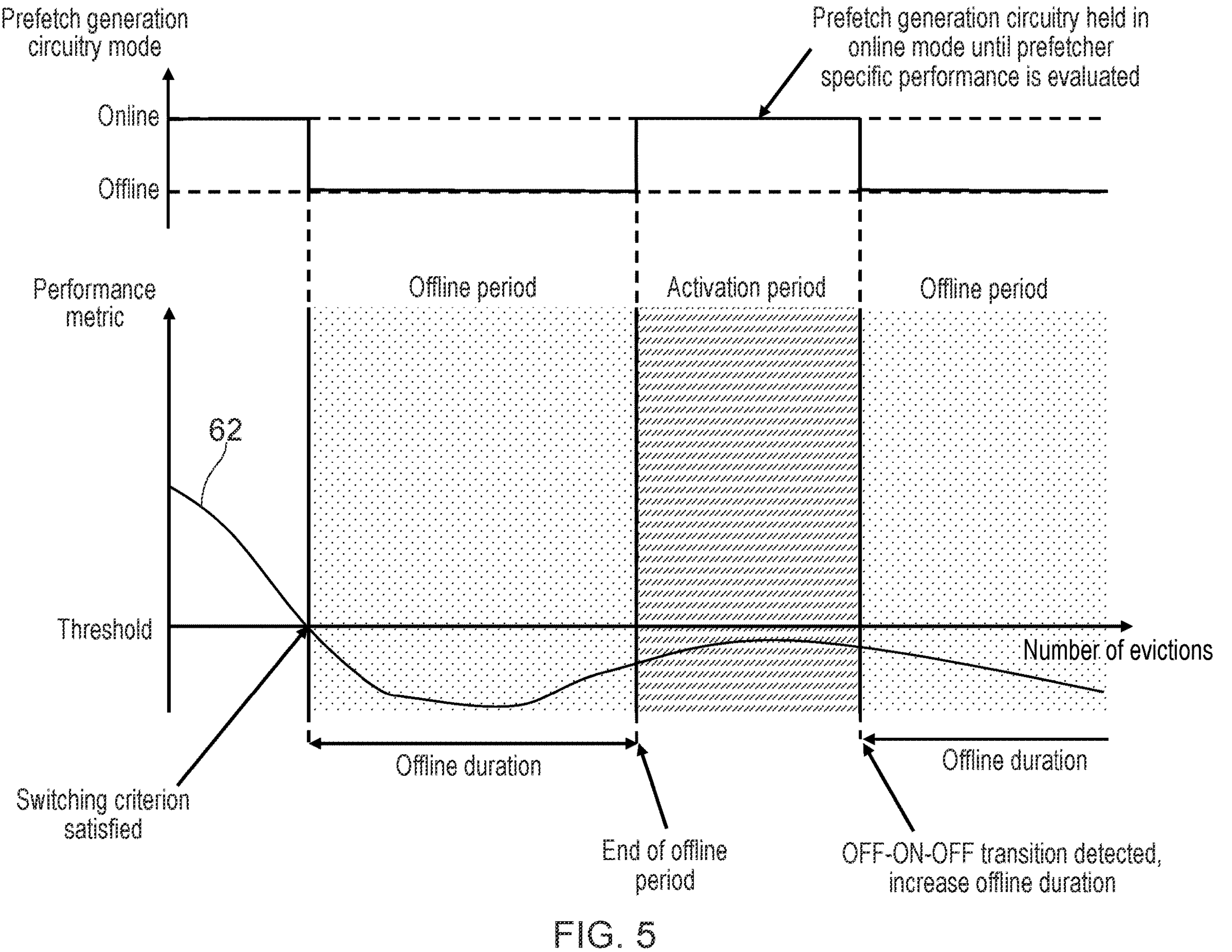
FIG. 5 schematically illustrates mode switching according to some configurations of the present techniques.

FIG. 5 schematically illustrates a further example of using a performance metric 62 to determine the operational mode of the prefetch generation circuitry in the future period. In the illustrated configuration, the behaviour of the performance metric 62 and the behaviour of the control circuitry initially follow the behaviour described in relation to FIG. 4 with the performance metric 62 dropping and the control circuitry controlling the prefetch generation circuitry to operate in the offline mode for an offline period having an offline duration. In contrast to FIG. 4, the performance metric 62 remains below the threshold for the offline duration. At the end of the offline period, the control circuitry causes the prefetch generation circuitry to operate in the online mode for the activation period. During the activation period, the prefetch generation circuitry is able to generate prefetch requests. The activation period lasts until a measurement of the performance metric 62 has been completed based on the operational characteristics of the prefetch generation circuitry. In other words, the activation period continues until the control circuitry is confident that the performance metric 62 reflects the behaviour of the prefetch generation circuitry. In the illustrated configuration, the performance metric 62 remains below the threshold for the duration of the activation period. At the end of the activation period, the control circuitry determines, based on the performance metric 62, that the prefetch generation circuitry is not operating above the threshold performance and causes the prefetch generation circuitry to switch back to the offline mode for a second offline period. The control circuitry determines that the prefetch generation circuitry has made an OFF-ON-OFF transition and increases the offline duration such that the second offline period lasts for a longer offline duration.

Figure 6:
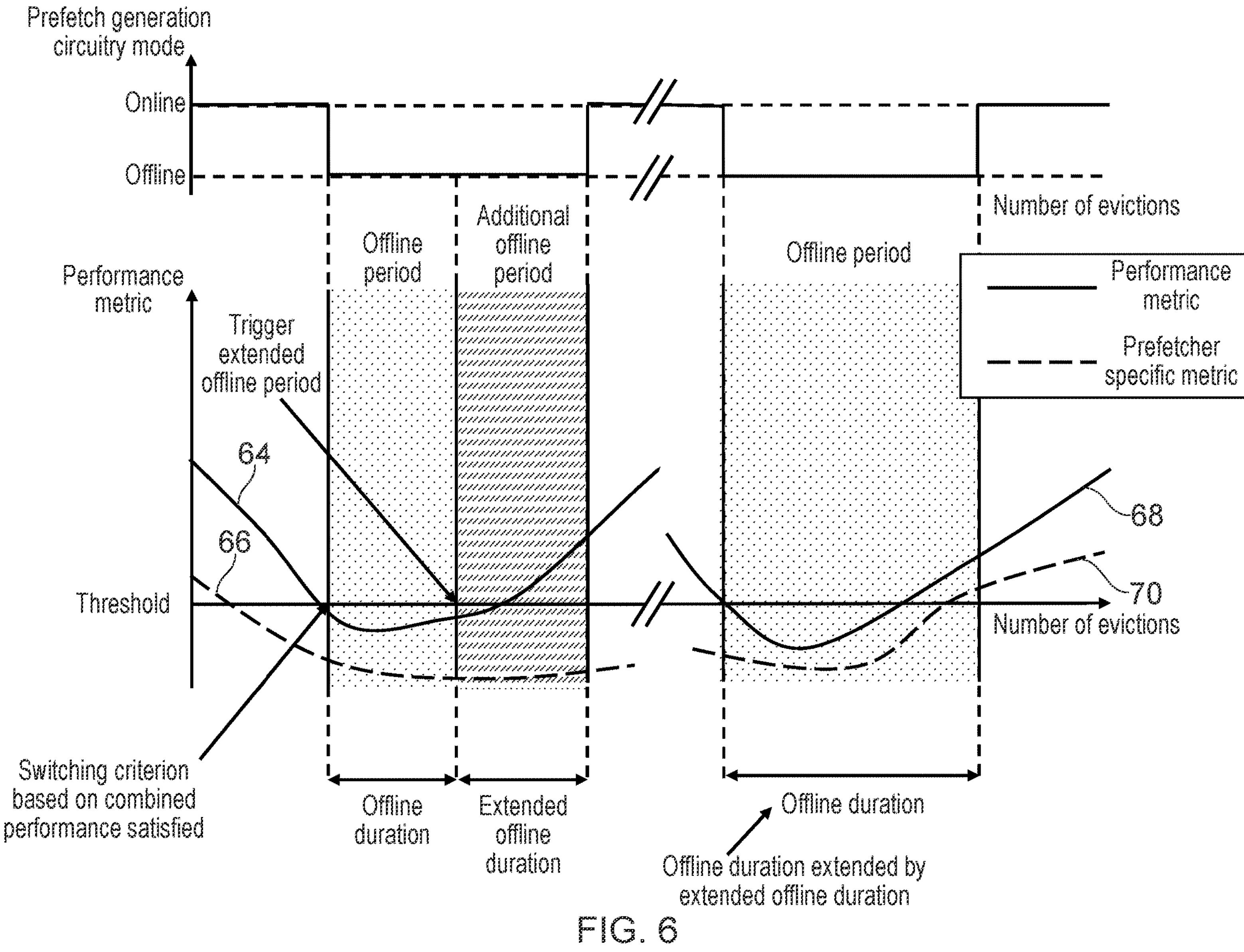
FIG. 6 schematically illustrates mode switching according to some configurations of the present techniques.

FIG. 6 schematically illustrates a further example of using performance metrics to determine the operational mode of the prefetch generation circuitry in the future period. FIG. 6 illustrates a performance metric 64 during a first period and the performance metric 68 during a second period which may each include a contribution from a prefetcher specific metric and a memory system metric, for example, as illustrated in FIG. 3. The illustrated example also shows the contribution of the prefetcher specific performance metric 66 during the first period and the prefetcher specific performance metric 70 during the second period. During the first period, the prefetch generation circuitry is operated in the online mode, and both the performance metric 64 and the prefetcher specific performance metric 66 both start above the threshold but drop to below the threshold. Once the performance metric 64 drops to below the threshold, the control circuitry switches the prefetch generation circuitry to the offline mode for an offline period lasting for an offline duration. The prefetch generation circuitry is held in the offline mode for the entire offline duration independent of the behaviour of the performance metric 64 and independent of the behaviour of the prefetcher specific performance metric 66. During the offline period, the control circuitry monitors the prefetcher specific metric 66. Whilst the prefetch generation circuitry is operating in the online mode, the prefetcher specific metric 66 is indicative of how well prefetches generated by the prefetch generation circuitry are performing. When the prefetch generation circuitry is operating in the offline mode, the prefetcher specific metric 66 is indicative of how well prefetches that were generated by the prefetch generation circuitry, whilst the prefetch generation circuitry was operating in the online mode, are performing. Whilst the prefetch generation circuitry is operating in the offline mode, the prefetcher specific metric 66 therefore indicates a residual accuracy of the prefetch generation circuitry. During the offline period, the control circuitry monitors the prefetcher specific performance metric 66 to determine an operational mode for the prefetch generation circuitry subsequent to the offline period. In particular, the control circuitry determines whether to switch the operation of the prefetch generation circuitry to the online mode or whether to hold the prefetch generation circuitry in the offline mode for an additional offline period having an extended offline duration. In the illustrated configuration, the prefetcher specific performance metric 66 continues to decrease during the offline period and the performance metric 64 remains below the threshold. As a result, the control circuitry holds the prefetch generation circuitry in the offline mode for the additional offline period. During the additional offline period, the prefetcher specific performance metric 66 begins to increase and the performance metric 64 increases so that it is above the threshold. Consequently, subsequent to the additional offline period, the control circuitry causes the prefetch generation circuitry to operate in the online mode. The prefetch generation circuitry operates in the online mode for the remainder of the first period. Subsequent to the additional offline period, the control circuitry modifies the offline duration such that a subsequent offline period lasts for longer (for a greater number of evictions from the local storage circuitry).

During the second period, the performance metric 68 falls below the threshold and, as a result, the control circuitry causes the prefetch generation circuitry to switch from the online mode to the offline mode for an offline period lasting for the offline duration. The offline duration was extended as a result of the prefetch generation circuitry being held in the offline mode for the additional offline period described above. During the second period, whilst the prefetch generation circuitry is in the offline mode, the performance metric 68 increases and the prefetcher specific performance metric 70 increases. As a result, the control circuitry causes the prefetch generation circuitry to switch to the online mode subsequent to the offline period. In the illustrated example, subsequent to the prefetch generation circuitry being switched to the online mode in the second period, the offline duration is retained at the same value, due to the absence of an additional offline period during the second period, and is neither increased nor decreased.

Figure 7:
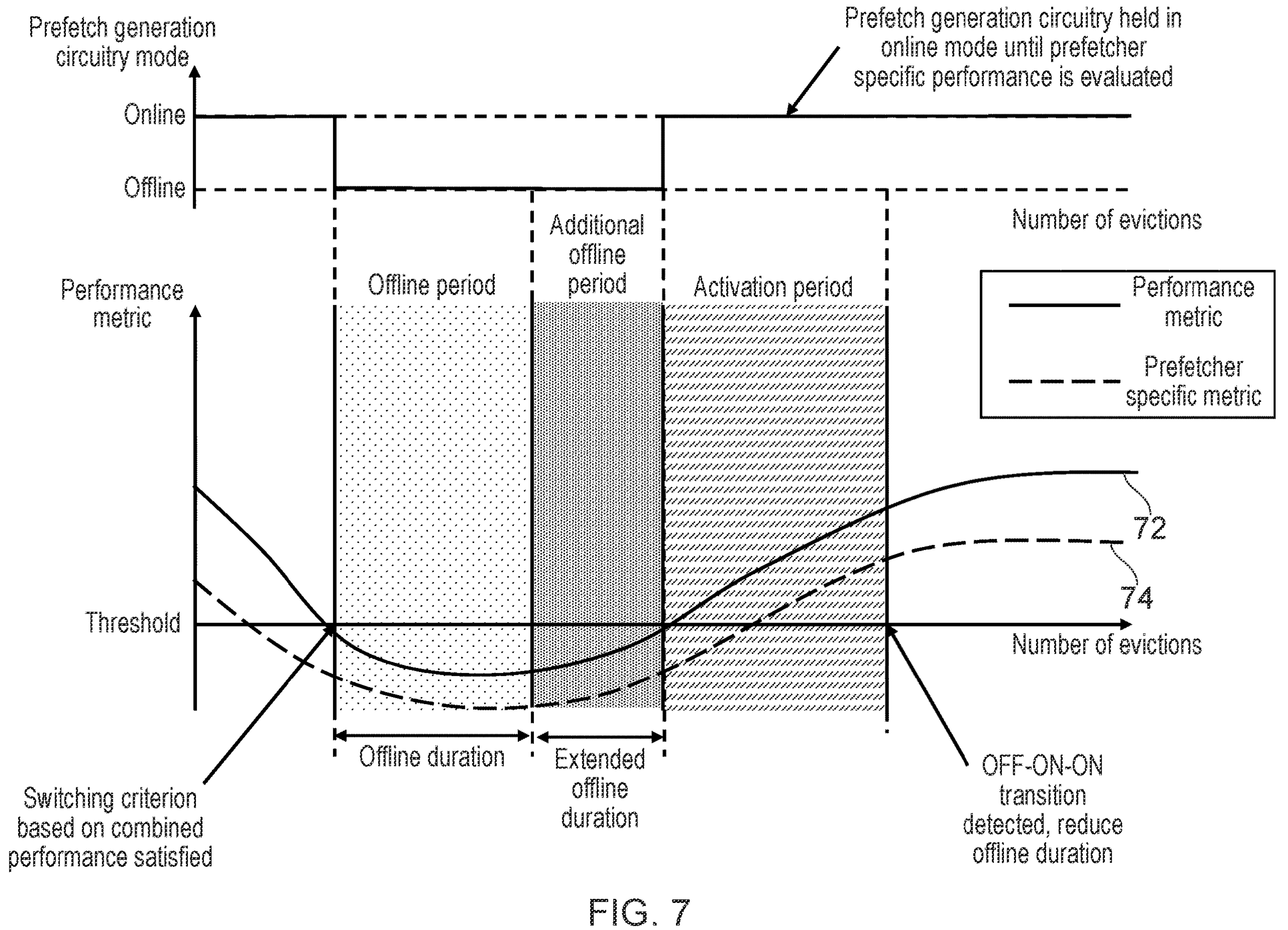
FIG. 7 schematically illustrates mode switching according to some configurations of the present techniques.

FIG. 7 schematically illustrates a further example of using a performance metric 72 and a prefetcher specific performance metric 74 to determine the operational mode of the prefetch generation circuitry in the future period. In the illustrated configuration, the future period comprises both an additional offline period and an activation period subsequent to the activation period. Initially, the prefetch generation circuitry is operated in the online mode, and both the performance metric 72 and the prefetcher specific metric 74 are above the threshold. As the number of evictions increases, the performance metric 72 and the prefetcher specific performance metric 74 fall below the threshold causing the control circuitry to switch the prefetch generation circuitry to operate in the offline mode for an offline period lasting for an offline duration. Whilst the prefetch generation circuitry is operating in the offline mode, the control circuitry monitors the prefetcher specific metric 74 which continues to decrease. As a result, the control circuitry causes the prefetch generation circuitry to operate in the offline mode for an additional offline period subsequent to the offline period. The additional offline period lasts for an extended offline duration. During the additional offline period, the control circuitry identifies that the prefetcher specific performance metric 74 is increasing and the performance metric 72 is also increasing. As a result, subsequent to the additional offline period, the control circuitry causes the prefetch generation circuitry to operate in the online mode for an activation period. During the activation period, the control circuitry is prevented from switching the prefetch generation circuitry back to the offline mode. When the control circuitry switches the prefetch generation circuitry to the online mode, the control circuitry also increases the offline period so that the next offline period extends for the sum of the offline duration and the extended offline duration. During the activation period, the prefetch generation circuitry operates in the online mode. The activation period lasts until a measurement of the performance metric 72 has been completed based on the operational characteristics of the prefetch generation circuitry. In other words, the activation period continues until the control circuitry is confident that the performance metric 72 reflects the behaviour of the prefetch generation circuitry. In the illustrated example, the performance metric 72 continues to increase during the activation period. As a result, at the end of the activation period, the prefetch generation circuitry makes an OFF-ON-ON transition and the control circuitry causes the prefetch generation circuitry to be held in the online mode. Subsequent to the activation period, the offline duration for a subsequent offline period is reduced.

Figure 8:
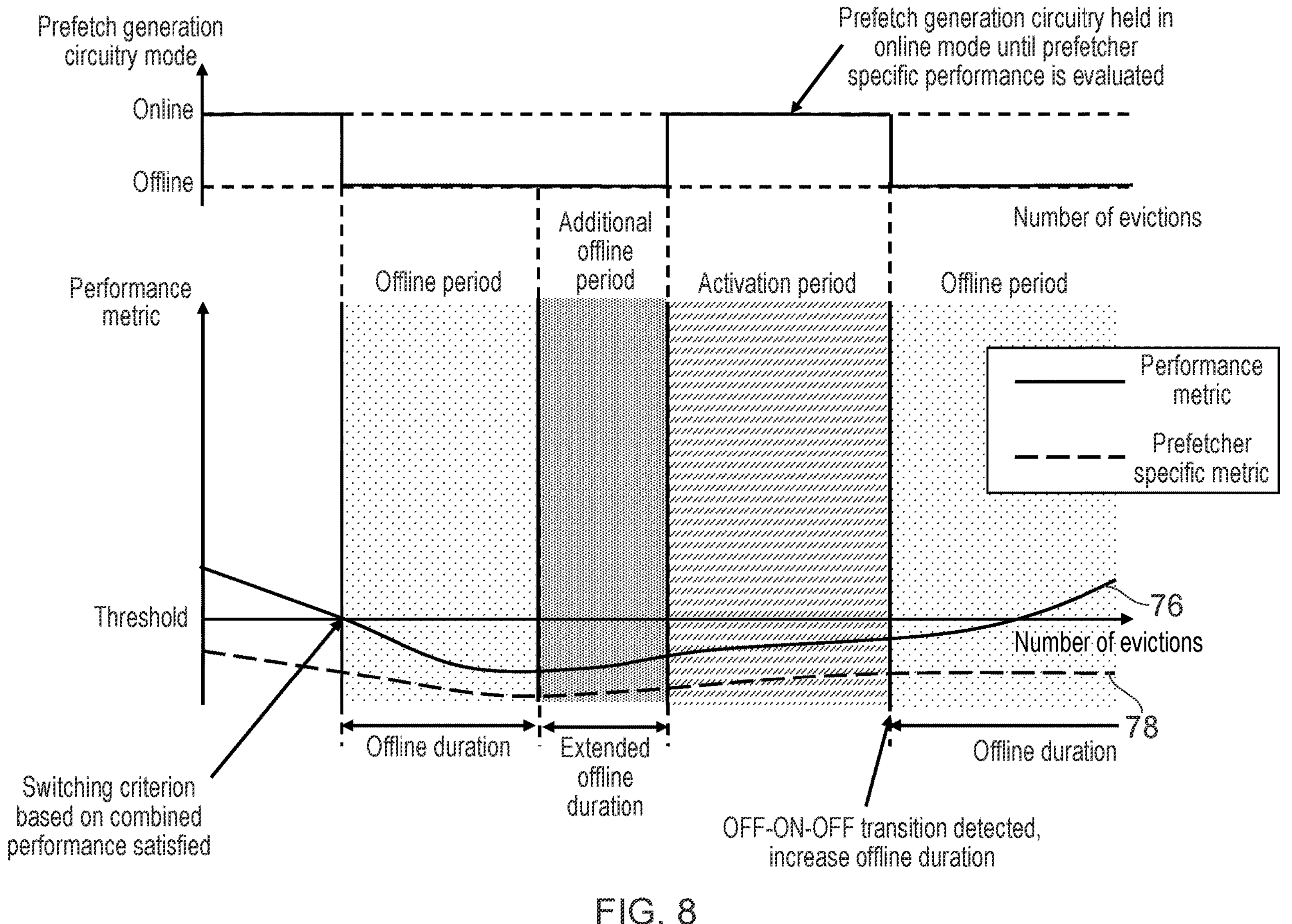
FIG. 8 schematically illustrates mode switching according to some configurations of the present techniques.

FIG. 8 schematically illustrates a further example of using a performance metric 76 and a prefetcher specific performance metric 78 to determine the operational mode of the prefetch generation circuitry in the future period. In the illustrated configuration, the future period comprises both an additional offline period and an activation period subsequent to the activation period. Initially, the prefetch generation circuitry is operated in the online mode, and both the performance metric 76 and the prefetcher specific metric 78 are above the threshold. As the number of evictions increases, the performance metric 76 and the prefetcher specific performance metric 78 fall below the threshold causing the control circuitry to switch the prefetch generation circuitry to operate in the offline mode for an offline period lasting for an offline duration. Whilst the prefetch generation circuitry is operating in the offline mode, the control circuitry monitors the prefetcher specific metric 78 which continues to decrease. As a result, the control circuitry causes the prefetch generation circuitry to operate in the offline mode for an additional offline period subsequent to the offline period. The additional offline period lasts for an extended offline duration. During the additional offline period, the control circuitry identifies that the prefetcher specific performance metric 78 is increasing and the performance metric 76 is also increasing. However, both the prefetcher specific metric 78 and the performance metric 76 remain below the threshold. As a result, subsequent to the additional offline period, the control circuitry causes the prefetch generation circuitry to operate in the online mode for an activation period. During the activation period, the control circuitry is prevented from switching the prefetch generation circuitry back to the offline mode. When the control circuitry switches the prefetch generation circuitry to the online mode, the control circuitry also increases the offline period so that the next offline period extends for the sum of the offline duration and the extended offline duration. During the activation period, the prefetch generation circuitry operates in the online mode. The activation period lasts until a measurement of the performance metric 76 has been completed based on the operational characteristics of the prefetch generation circuitry. In other words, the activation period continues until the control circuitry is confident that the performance metric 76 reflects the behaviour of the prefetch generation circuitry. In the illustrated example, the performance metric 76 remains below the threshold during the activation period. As a result, at the end of the activation period, the prefetch generation circuitry makes an OFF-ON-OFF transition and the control circuitry causes the prefetch generation circuitry to switch to the offline mode. Subsequent to the activation period, the offline duration for a subsequent offline period is increased.

FIGS. 4 to 8 schematically illustrate a number of possible examples of how the control circuitry can be used to control the operational mode of the prefetch generation circuitry during a future period. It would be readily apparent to the person of ordinary skill in the art that alternative scenarios are possible. Furthermore, whilst the performance metric and the prefetcher specific metric are illustrated on the same scale and relative to the same threshold, it would be readily apparent that different scales and thresholds may be used to measure the prefetcher specific performance metric and the performance metric.

Figure 9:
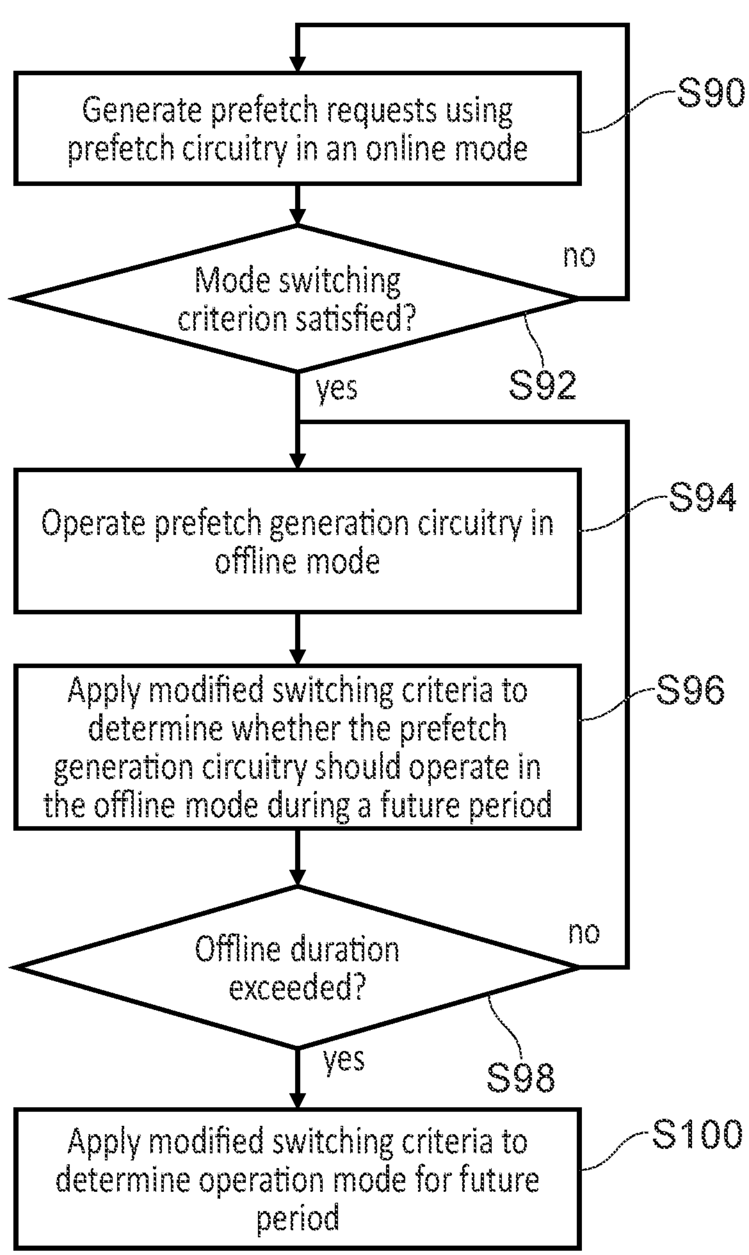
FIG. 9 schematically illustrates a sequence of steps carried out according to some configurations of the present techniques.

FIG. 9 schematically illustrates a sequence of steps carried out in accordance with the present techniques. Flow begins at step S90, where prefetch requests are generated using prefetch generation circuitry operating in an online mode. Flow then proceeds to step S92, where it is determined if the mode switching criterion is satisfied. If, at step S92, it is determined that the mode switching criterion is not satisfied, then flow returns to step S90 and the prefetch generation circuitry is held in the online mode. If, at step S92, it was determined that the mode switching criterion is satisfied, then flow proceeds to step S94. At step S94, the prefetch generation circuitry is switched to operate in the offline mode for an offline period lasting for an offline duration. Whilst operating in the offline mode, the prefetch generation circuitry is unable to generate prefetch requests. It is noted that prefetch training circuitry configured to generate training data to be used by the prefetch generation circuitry is not affected by the switch the offline mode and continues to generate training data. Flow then proceeds to step S96 where modified switching criteria are applied to determine whether the prefetch generation circuitry should operate in the offline mode during a future period. Flow then proceeds to step S98 where it is determined if the offline duration is exceeded. If, at step S98, it is determined that the offline duration is not exceeded, then flow returns to step S94 and the prefetch generation circuitry continues to be held in the offline mode. If, at step S98, it was determined that the offline duration has been exceeded, then flow proceeds to step S100 where a modified switching criteria is applied to determine the operation mode for the future period.

Figure 10:
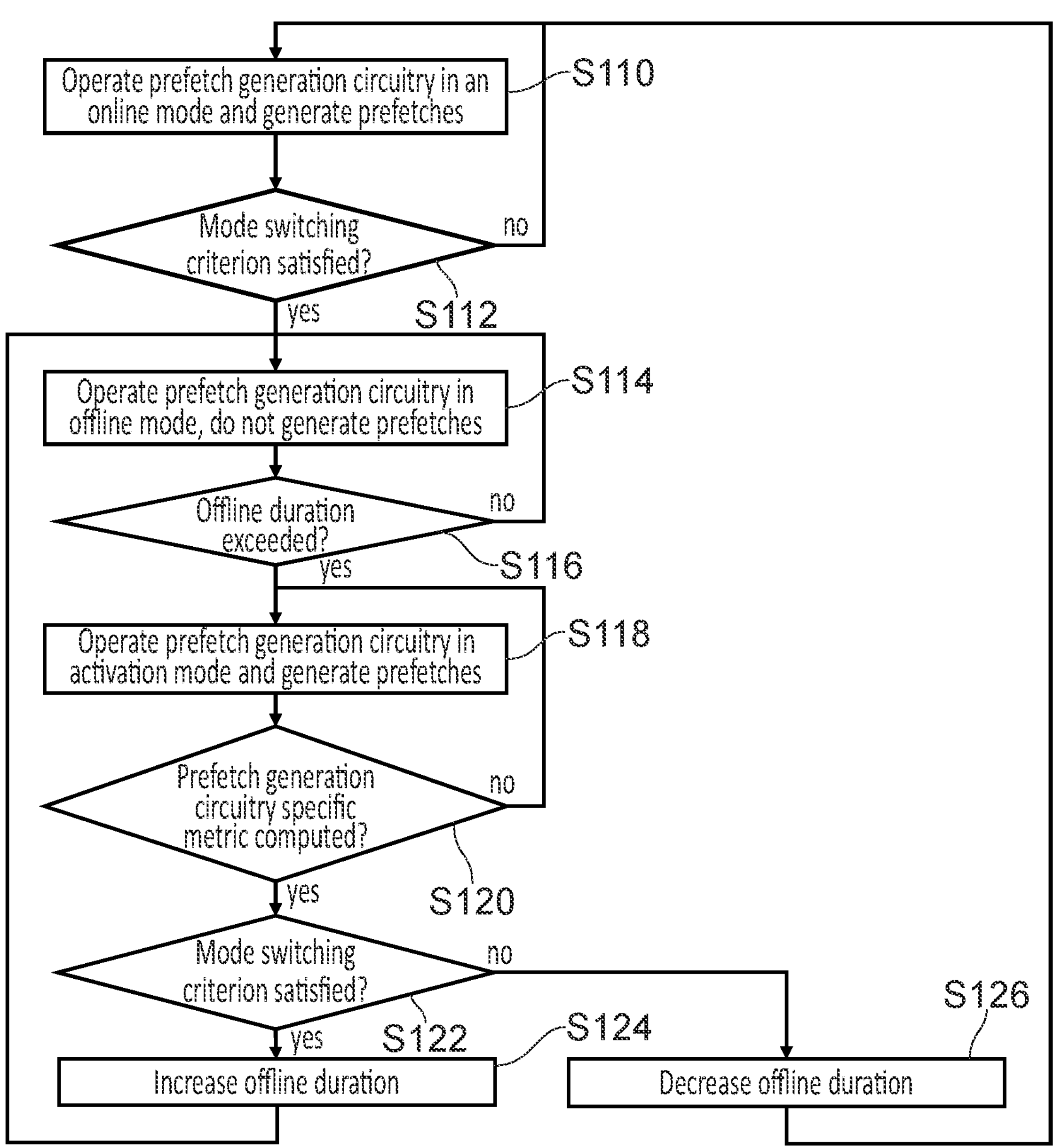
FIG. 10 schematically illustrates a sequence of steps carried out according to some configurations of the present techniques.

FIG. 10 schematically illustrates a sequence of steps carried out in accordance with some configurations of the present techniques. Flow begins at step S110 where the prefetch generation circuitry is operated in an online mode in which the prefetch generation circuitry is capable of generating prefetch requests. Flow then proceeds to step S112 where it is determined if the mode switching criterion is satisfied. If, at step S112, it is determined that the mode switching criterion is not satisfied, then flow returns to step S110. If, at step S112, it is determined that the mode switching criterion is satisfied, then flow proceeds to step S114. At step S114, the prefetch generation circuitry is operated in the offline mode and does not generate prefetches. Flow then proceeds to step S116 where it is determined if the offline duration is exceeded. If, at step S116, it is determined that the offline duration is not exceeded, then flow returns to step S114. If, at step S116, it is determined that the offline duration is exceeded, then flow proceeds to step S118. At step S118, the prefetch generation circuitry is operated in an activation mode (the online mode lasting for the activation period). Whilst operating in the activation mode, the prefetch generation circuitry is able to generate prefetches and cannot be switched to the offline mode until the activation period has passed. Flow then proceeds to step S120 where it is determined if a prefetch generation circuitry specific metric has been computed. If at step S120, it is determined that the prefetch generation circuitry specific metric has not been computed, then flow returns to step S118 and the prefetch generation circuitry remains in the activation mode. If, at step S120, it is determined that the prefetch generation circuitry specific metric has been computed, then the activation period ends and flow proceeds to step S122. At step S122 it is determined whether the mode switching criterion is satisfied. If. At step S122, it is determined that the mode switching criterion is satisfied, then flow proceeds to step S124. At step S124 the offline duration is increased before flow returns to step S114. If, at step S122, it is determined that the mode switching criterion is not satisfied, then flow proceeds to step S126. At step S126, the offline duration is decreased before flow returns to step S110.

Figure 11:
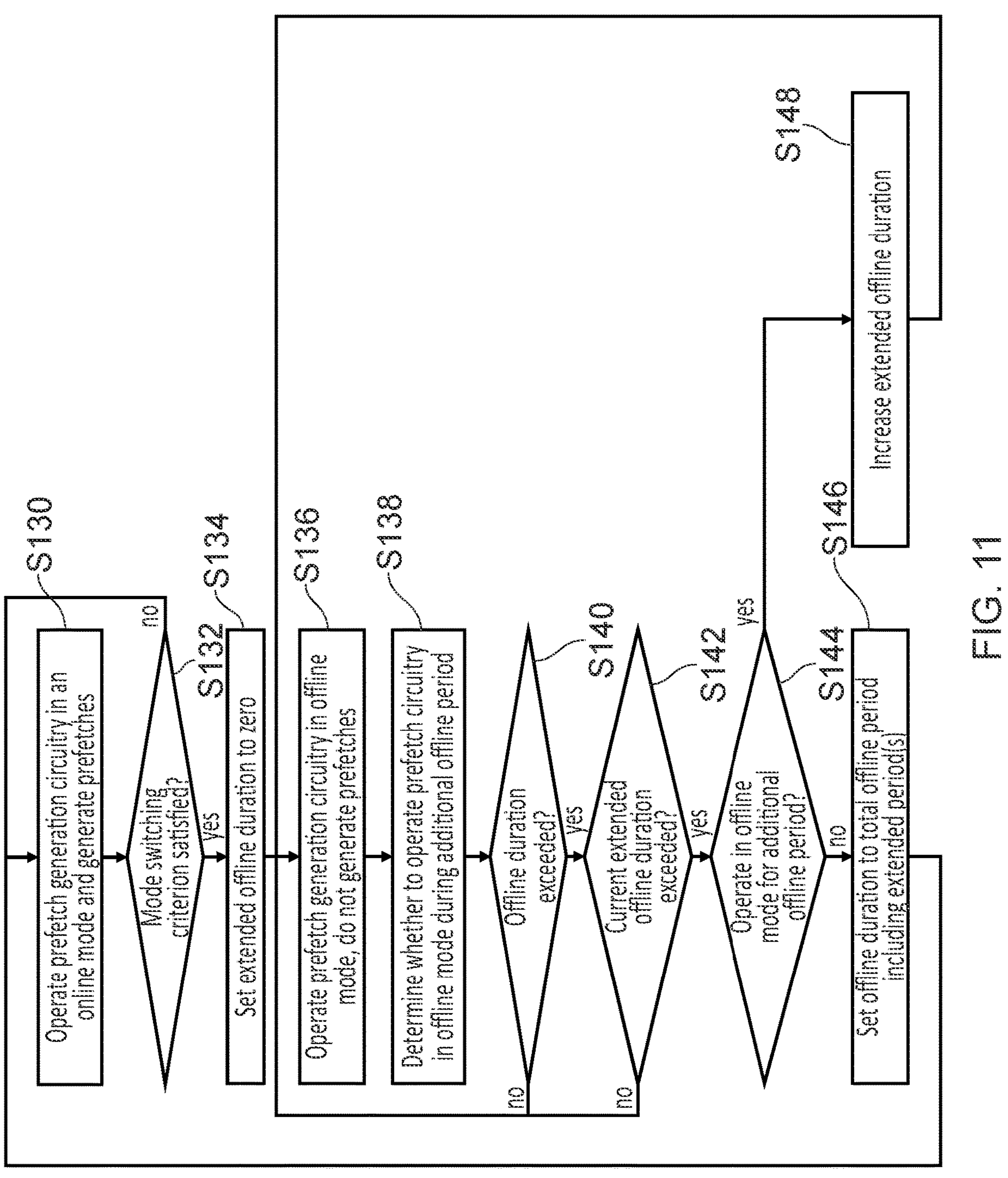
FIG. 11 schematically illustrates a sequence of steps carried out according to some configurations of the present techniques.

FIG. 11 schematically illustrates a sequence of steps carried out in accordance with some configurations of the present techniques. Flow begins at step S130 where the prefetch generation circuitry is operated in an online mode and is able to generate prefetches. Flow then proceeds to step S132 where it is determined if the mode switching criterion is satisfied. If, at step S132, it is determined that the mode switching criterion is not satisfied, then flow returns to step S130. If, at step S132, it is determined that the mode switching criterion is satisfied, then flow proceeds to step S134 where the extended offline duration is set to zero. Flow then proceeds to step S136 where the control circuitry causes the prefetch generation circuitry to operate in the offline mode. When operating in the offline mode, the prefetch generation circuitry is prevented from generating prefetch requests. Flow then proceeds to step S138 where it is determined whether or not to operate the prefetch generation circuitry in the offline mode during an additional offline period, for example, based on a prefetcher specific metric computed during the offline period. Flow then proceeds to step S140 where it is determined if the offline duration has been exceeded. If, at step S140, it is determined that the offline duration has not been exceed, then flow returns to step S136. If, at step S140, it was determined that the offline duration has been exceeded, then flow proceeds to step S142. At step S142 it is determined whether the current extended offline duration has been exceeded. If, at step S142, it is determined that the current extended offline duration has not been exceeded, then flow returns to step S136. If, at step S142, it is determined that the current extended offline duration has been exceeded, then flow proceeds to step S144. At step S144, it is determined whether to operate in the offline mode for an additional offline period (for example, based on the determination of step S138). If, at step S144, it is determined that the prefetch generation circuitry should be operated in the offline mode for an additional offline period, then flow proceeds to step S148 where the extended offline duration is increased. Flow then returns to step S136. If, at step S144, it is determined not to operate the prefetch generation circuitry in the offline mode for an additional offline period, then flow proceeds to step S146 where the offline duration is set to the total offline period including any extended offline period(s). Flow then returns to step S130.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 12:
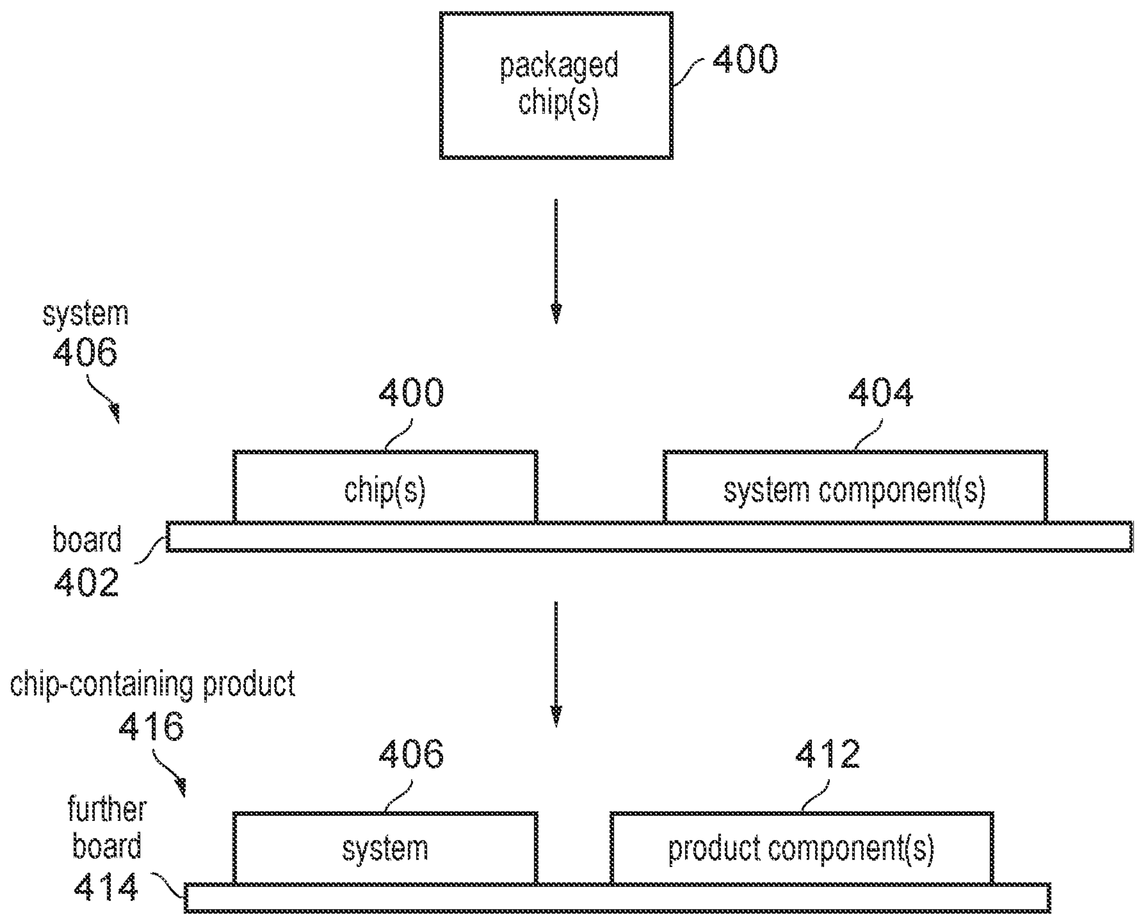
FIG. 12 schematically illustrates a system and a chip containing product according to some configurations of the present techniques.

As shown in FIG. 12, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there is provided an apparatus, a system, a chip containing product, a method and a medium. The apparatus comprises prefetch generation circuitry configured to generate prefetch requests. The apparatus is also provided with control circuitry configured to determine an operational mode for the prefetch generation circuitry from a plurality of operational modes comprising an offline mode in which prefetch requests are not generated and at least one online mode in which prefetch requests are generated. The control circuitry is configured to switch the prefetch generation circuitry from the online mode to the offline mode for an offline period based on a mode switching criterion. The control circuitry is responsive to a switch to the offline mode, to apply modified switching criteria to determine whether the prefetch generation circuitry should operate in the offline mode during a future period occurring subsequent to the offline period.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:
- prefetch generation circuitry configured to generate prefetch requests to prefetch data from memory into local storage circuitry in advance of a demand request for the data by processing circuitry; and
- control circuitry configured to determine an operational mode for the prefetch generation circuitry from a plurality of operational modes comprising an offline mode in which prefetch requests are not generated and at least one online mode in which prefetch requests are generated,
- wherein the control circuitry is configured:
- to switch the prefetch generation circuitry from the at least one online mode to the offline mode for an offline period based on a mode switching criterion, the offline period lasting for an offline duration; and
- in response to a switch to the offline mode, to apply modified switching criteria to determine whether the prefetch generation circuitry should operate in the offline mode during a future period occurring subsequent to the offline period.

Clause 2. The apparatus of clause 1, wherein:
- the future period comprises an activation period;
- the control circuitry is configured to switch the prefetch generation circuitry from the offline mode to the at least one online mode subsequent to the offline period; and
- the modified switching criteria prevents the control circuitry switching the prefetch generation circuitry to the offline mode during the activation period.

Clause 3. The apparatus of clause 2, wherein the activation period extends until a prefetcher specific performance metric is calculated.

Clause 4. The apparatus of clause 3, wherein the prefetcher specific performance metric is an accuracy metric relating to the accuracy of the prefetch requests.

Clause 5. The apparatus of any of clauses 2 to 4, wherein the control circuitry is responsive to the prefetcher specific performance metric being calculated, to adjust the offline duration.

Clause 6. The apparatus of clause 6, wherein the control circuitry is responsive to the prefetcher specific performance metric being satisfied:
- when the mode switching criterion is satisfied, to extend the offline duration; and
- when the mode switching criterion is not satisfied, to reduce the offline duration.

Clause 7. The apparatus of any preceding clause, wherein:
- the future period comprises an additional offline period; and
- the modified switching criteria prevents the control circuitry switching the prefetch generation circuitry to the at least one online mode during the additional offline period.

Clause 8. The apparatus of clause 7, wherein the control circuitry is configured to calculate an extended offline duration of the extended offline period based on a residual prefetcher specific performance metric.

Clause 9. The apparatus of clause 8, wherein the residual prefetcher specific performance metric is calculated based on evictions of prefetched data from the local storage circuitry.

Clause 10. The apparatus of clause 9, wherein the residual prefetcher specific performance metric is calculated from a number of useful prefetch requests evicted from the local storage circuitry compared to a number of unused prefetched requests evicted from the local storage circuitry.

Clause 11. The apparatus of any of clauses 7 to 10, wherein the control circuitry is configured to switch the prefetch generation circuitry from the offline mode to the at least one online mode subsequent to the additional offline period and to extend the offline duration by the extended offline duration.

Clause 12. The apparatus of any preceding clause, wherein:
- the mode switching criterion is based on a combination of a prefetcher metric specific to the prefetch generation circuitry and a memory system metric dependent on at least one event which is independent of prefetch generation by the prefetch generation circuitry; and
- the modified switching criteria excludes the memory system metric.

Clause 13. The apparatus of clause 12, wherein the prefetcher metric is a prefetch accuracy metric calculated based on evictions from the local storage circuitry, and the memory system metric is a congestion metric based on a number of cycles taken to respond to the prefetch requests.

Clause 14. The apparatus of clause 12 or clause 13, wherein the control circuitry is configured to retain a history of at least one of the prefetcher metric and the memory system metric, and the switching criteria is based on the history.

Clause 15. The apparatus of any preceding clause, wherein:

the prefetch generation circuitry comprises prefetch training circuitry configured to generate training information to be used by the prefetch generation circuitry to generate the prefetch requests; and the prefetch training circuitry is configured to generate the training information when operating in both of the offline mode and the at least one online mode.

Clause 16. The apparatus of any preceding clause, wherein the offline duration is measured in terms of evictions from the local storage circuitry.

Clause 17. A system comprising:

the apparatus of any preceding clause, implemented in at least one packaged chip;

at least one system component; and a board, wherein the at least one packaged chip and the at least one system component are assembled on the board.

Clause 18. A chip-containing product comprising the system of clause 17 assembled on a further board with at least one other product component.

Clause 19. A method comprising:

with prefetch generation circuitry, generating prefetch requests to prefetch data from memory into local storage circuitry in advance of a demand request for the data by processing circuitry;

determining an operational mode for the prefetch generation circuitry from a plurality of operational modes comprising an offline mode in which prefetch requests are not generated and at least one online mode in which prefetch requests are generated;

switching the prefetch generation circuitry from the at least one online mode to the offline mode for an offline period based on a mode switching criterion, the offline period lasting for an offline duration; and in response to a switch to the offline mode, applying modified switching criteria to determine whether the prefetch generation circuitry should operate in the offline mode during a future period occurring subsequent to the offline period.

Clause 20. A non-transitory computer-readable medium to store computer-readable code for fabrication of the apparatus of any of clauses 1 to 18.

We claim:

1. An apparatus comprising:

prefetch generation circuitry configured to generate prefetch requests to prefetch data from memory into local storage circuitry in advance of a demand request for the data by processing circuitry; and control circuitry configured to determine an operational mode for the prefetch generation circuitry from a plurality of operational modes comprising an offline mode in which prefetch requests are not generated and at least one online mode in which prefetch requests are generated, wherein the control circuitry is configured:

to switch the prefetch generation circuitry from the at least one online mode to the offline mode for an offline period based on a mode switching criterion, the offline period lasting for a specified offline duration, wherein the mode switching criterion is based at least in part on performance of the prefetch generation circuitry; and in response to a switch to the offline mode, to apply modified switching criteria to determine whether the prefetch generation circuitry should operate in the offline mode during a future period occurring subsequent to the offline period.

2. The apparatus of claim 1, wherein:

the future period comprises an activation period;

the control circuitry is configured to switch the prefetch generation circuitry from the offline mode to the at least one online mode subsequent to the offline period; and the modified switching criteria prevents the control circuitry switching the prefetch generation circuitry to the offline mode during the activation period.

3. The apparatus of claim 2, wherein the activation period extends until a prefetcher specific performance metric is calculated.

4. The apparatus of claim 3, wherein the prefetcher specific performance metric is an accuracy metric relating to the accuracy of the prefetch requests.

5. The apparatus of claim 3, wherein the control circuitry is responsive to the prefetcher specific performance metric being calculated, to adjust the offline duration.

6. The apparatus of claim 5, wherein the control circuitry is responsive to the prefetcher specific performance metric being calculated:

when the mode switching criterion is satisfied, to extend the offline duration; and when the mode switching criterion is not satisfied, to reduce the offline duration.

7. The apparatus of claim 1, wherein:

the future period comprises an additional offline period; and the modified switching criteria prevents the control circuitry switching the prefetch generation circuitry to the at least one online mode during the additional offline period.

8. The apparatus of claim 7, wherein the control circuitry is configured to calculate an extended offline duration of the extended offline period based on a residual prefetcher specific performance metric.

9. The apparatus of claim 8, wherein the residual prefetcher specific performance metric is calculated based on evictions of prefetched data from the local storage circuitry.

10. The apparatus of claim 9, wherein the residual prefetcher specific performance metric is calculated from a number of useful prefetch requests evicted from the local storage circuitry compared to a number of unused prefetched requests evicted from the local storage circuitry.

11. The apparatus of claim 7, wherein the control circuitry is configured to switch the prefetch generation circuitry from the offline mode to the at least one online mode subsequent to the additional offline period and to extend the offline duration by the extended offline duration.

12. The apparatus of claim 1, wherein:

the mode switching criterion is based on a combination of a prefetcher metric specific to the prefetch generation circuitry and a memory system metric dependent on at least one event which is independent of prefetch generation by the prefetch generation circuitry; and the modified switching criteria excludes the memory system metric.

13. The apparatus of claim 12, wherein the prefetcher metric is a prefetch accuracy metric calculated based on evictions from the local storage circuitry, and the memory system metric is a congestion metric based on a number of cycles taken to respond to the prefetch requests.

14. The apparatus of claim 12, wherein the control circuitry is configured to retain a history of at least one of the prefetcher metric and the memory system metric, and the switching criteria is based on the history.

15. The apparatus of claim 1, wherein:

the prefetch generation circuitry comprises prefetch training circuitry configured to generate training information to be used by the prefetch generation circuitry to generate the prefetch requests; and the prefetch training circuitry is configured to generate the training information when operating in both of the offline mode and the at least one online mode.

16. The apparatus of claim 1, wherein the offline duration is measured in terms of evictions from the local storage circuitry.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17 assembled on a further board with at least one other product component.

19. A method comprising:

with prefetch generation circuitry, generating prefetch requests to prefetch data from memory into local storage circuitry in advance of a demand request for the data by processing circuitry;

determining an operational mode for the prefetch generation circuitry from a plurality of operational modes comprising an offline mode in which prefetch requests are not generated and at least one online mode in which prefetch requests are generated;

switching the prefetch generation circuitry from the at least one online mode to the offline mode for an offline period based on a mode switching criterion, the offline period lasting for a specified offline duration, wherein the mode switching criterion is based at least in part on performance of the prefetch generation circuitry; and in response to a switch to the offline mode, applying modified switching criteria to determine whether the prefetch generation circuitry should operate in the offline mode during a future period occurring subsequent to the offline period.

20. A non-transitory computer-readable medium to store computer-readable code for fabrication of an apparatus comprising:

prefetch generation circuitry configured to generate prefetch requests to prefetch data from memory into local storage circuitry in advance of a demand request for the data by processing circuitry; and control circuitry configured to determine an operational mode for the prefetch generation circuitry from a plurality of operational modes comprising an offline mode in which prefetch requests are not generated and at least one online mode in which prefetch requests are generated, wherein the control circuitry is configured:

to switch the prefetch generation circuitry from the at least one online mode to the offline mode for an offline period based on a mode switching criterion, the offline period lasting for a specified offline duration, wherein the mode switching criterion is based at least in part on performance of the prefetch generation circuitry; and in response to a switch to the offline mode, to apply modified switching criteria to determine whether the prefetch generation circuitry should operate in the offline mode during a future period occurring subsequent to the offline period.

* * * * *